UNITED STATES PATENT OFFICE.

RUDOLPH THEODOR ERNST HENSEL, OF DRESDEN, GERMANY.

MANUFACTURE OF ELECTRODES FOR PRIMARY OR SECONDARY BATTERIES.

SPECIFICATION forming part of Letters Patent No. 496,517, dated May 2, 1893.

Application filed June 17, 1892. Serial No. 437,063. (No specimens.)

*To all whom it may concern:*

Be it known that I, RUDOLPH THEODOR ERNST HENSEL, a subject of the King of Saxony, residing at Dresden, in the Kingdom of Saxony and German Empire, have invented certain new and useful Improvements in the Manufacture of Electrodes for Primary and Secondary Batteries, of which the following is a specification.

My invention relates more particularly to that class of electrodes for primary and secondary batteries, which require neither a metal core nor grid, nor a special internal conductor, and in which the active mass, or in other words, the mass itself is its own support.

Electrodes embodying features of my invention are composed of a plastic mass consisting of a material as salts or oxides of lead, having an electrolytic action, and of a suitable medium or cement, which may be indifferent or neutral; and the object of my invention is to improve the medium or cement in such manner that the component parts of the electrode are firmly bound together, whereby bending, buckling and disintegration are avoided and the strength, durability and efficiency of the electrode are enhanced.

My invention stated in general terms consists of an electrode for primary and secondary batteries requiring neither a solid metal core nor any special internal conductor, and comprises salts or oxides of metals having an electrolytic action, and a medium or cement composed of sulphuric acid, gelatine and an alkali, whereby the mixture acquires the consistency of a plastic mass.

My invention further consists of material for use in battery electrodes consisting of a metallic substance having an electrolytic action, sulphuric acid, gelatine and an alkali.

My invention further consists of material for use as a cement for battery electrodes, comprising an acid, gelatine and an alkali; and my invention further consists of the improvements in battery electrodes hereinafter described and claimed.

An electrode embodying features of my invention may be produced by mixing a salt or oxide of lead for example, chloride of lead or red oxide of lead with sulphuric acid, nitric acid or other equivalent acid, gelatine (such as common glue or size) and water-glass (silicate of soda); the proportion of gelatine to the water-glass being as one to two, more or less. If preferred the sulphuric acid, gelatine and water glass, if they are the materials employed, may be first mixed together to form a cement and this cement may then be mixed with the salt or oxide of lead. It may be remarked that instead of the silicate of soda, which is more or less alkaline, silicate of potash and many other alkalies as caustic soda or potash may advantageously be employed, in substantially the proportions above set forth. The mixture may be made in any suitable vessel or vessels and is stirred by means of a glass rod or other implement until it acquires the consistency of a paste or pulp, and the resultant plastic mass may be formed into any desired shape or configuration for use as an electrode by means of suitable presses or otherwise.

Whether the above described plastic mass results from a chemical combination of oxide or salts of lead, the gelatine, the alkali and acid, or from their mechanical mixture or association I am not prepared to say. However, in practice the mixture of such elements or substances in the manner herein set forth results in the production of a plastic mass that may be advantageously employed in making battery electrodes.

The finished electrodes may be mounted in batteries as heretofore and solutions of salts, acids or the like may be employed as electrolytes.

Having thus described the nature and objects of my invention, what I claim as new, and desire to secure by Letters Patent, is—

1. An electrode for primary and secondary batteries composed of a metallic salt or oxide having an electrolytic action, and a medium or cement comprising an acid, gelatine and an alkali, whereby the mixture acquires the consistency of a plastic mass, substantially as described.

2. Material for use in battery electrodes comprising a metallic oxide having an electrolytic action, an acid, gelatine and an alkali, substantially as and for the purposes set forth.

3. A material for use as a cement for battery electrodes comprising an acid, gelatine and an alkali, substantially as described.

In testimony whereof I have hereto set my hand in the presence of the two subscribing witnesses.

RUDOLPH THEODOR ERNST HENSEL.

Witnesses:
OTTO WOLFF,
HUGO DUMMER,
*Both of Dresden.*